May 26, 1925.

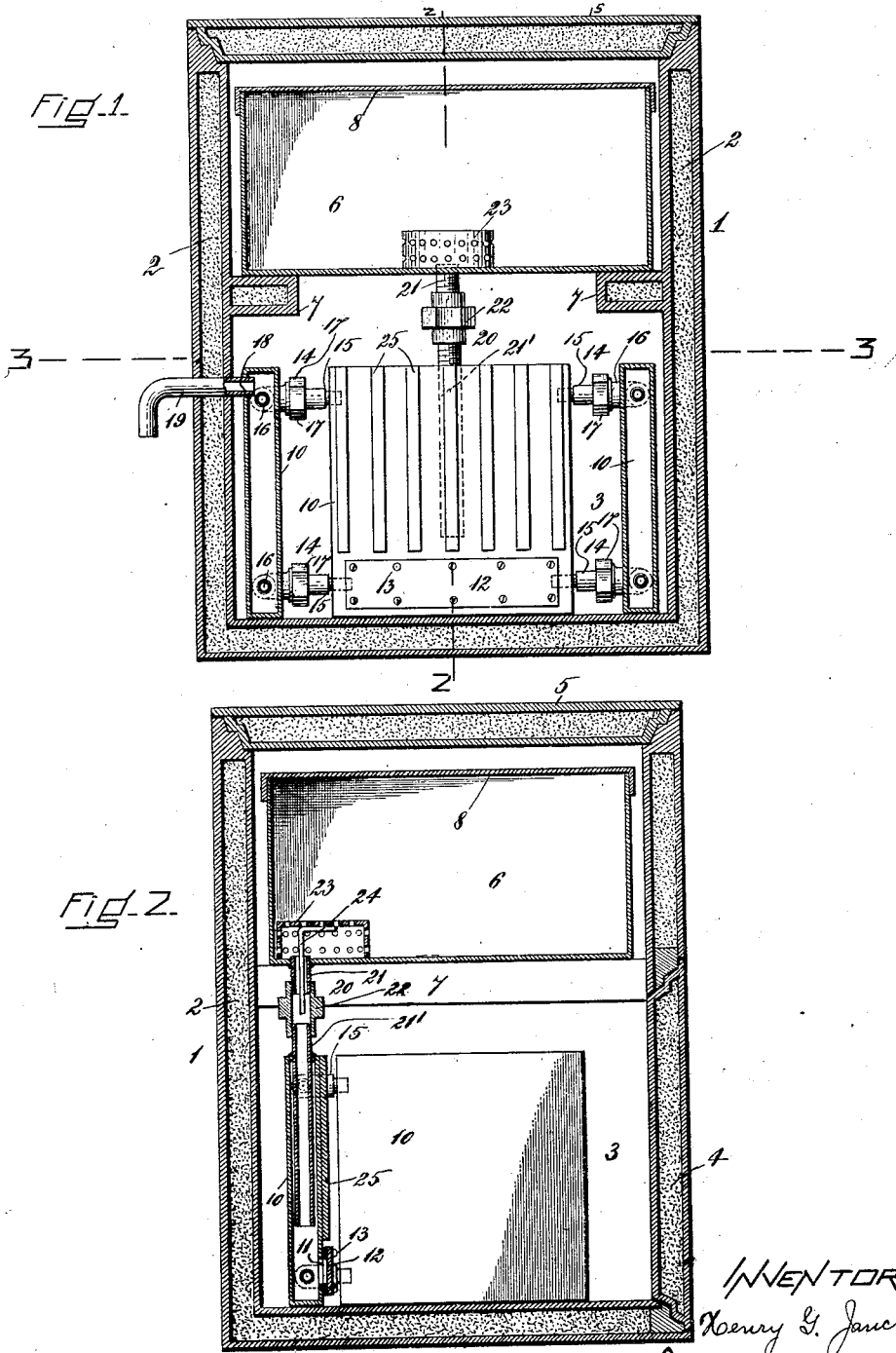

H. G. JANCSY

COOLING APPARATUS

Filed Oct. 6, 1922

INVENTOR=
Henry G. Jancsy
BY
ATTORNEYS

Patented May 26, 1925.

1,539,675

UNITED STATES PATENT OFFICE.

HENRY G. JANCSY, OF EVERETT, MASSACHUSETTS.

COOLING APPARATUS.

Application filed October 6, 1922. Serial No. 592,775.

*To all whom it may concern:*

Be it known that I, HENRY G. JANCSY, of Everett, in the county of Middlesex and State of Massachusetts, a citizen of the United States, have invented a new and useful Improvement in Cooling Apparatus, of which the following is a full, clear, and exact description, reference being had to the accompanying drawings, forming a part of this specification in explaining its nature.

The present invention relates to a cooling apparatus or refrigerator essentially adapted for keeping cool an article such as ice cream during its transportation by delivery truck or wagon. The cooling is effected by a cooling fluid preferably brine resulting from an admixture of ice and rock salt, and the apparatus essentially pertains to a means for circulating the brine.

The essential object of the invention is to provide an apparatus by which the cooling fluid or brine is best conserved and its cooling influence best disseminated and the escape thereof from the apparatus only allowed after it has absorbed heat and its cooling influence is no longer effective.

A further object of the invention is to provide an apparatus which will combine the element of efficiency with simplicity of construction; an apparatus which is composed of few easily replaceable parts and one which will not easily clog and which in any event can be readily cleansed at any time. This element of clogging is one of relative importance in apparatus of this nature for the circulatory systems of apparatus employed for a similar purpose are apt to easily clog and cannot readily be cleared and consequently cease to function.

The apparatus can best be seen and understood by reference to the drawings, in which—

Figure 1 shows the apparatus in vertical cross section.

Fig. 2 is a section on line 2—2 of Fig. 1.

Referring to the drawings:—

Figure 3:
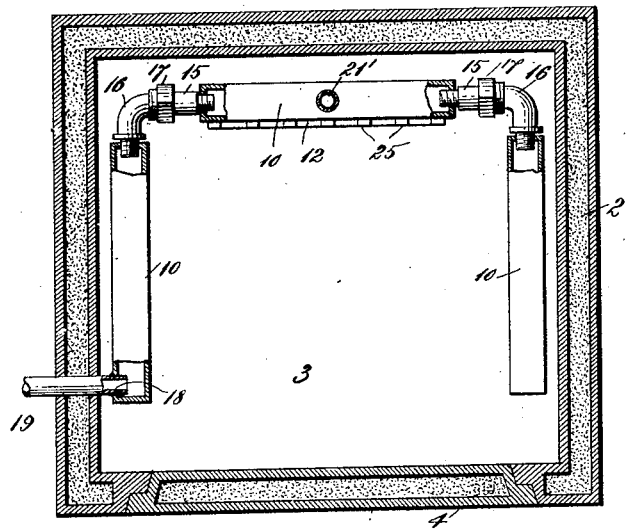
Fig. 3 is a section on line 3—3 of Fig. 1.

1 represents the body of the cooler. This is preferably rectangular in form with top, bottom, side and end walls all of which are insulated, being made double with a suitable insulating material 2 between them. Where the cooler is mounted upon a vehicle these insulated walls may comprise the body of the vehicle; or the body of the cooler may be an independent structure within or upon the vehicle body. The insulated body of the cooler forms a casing enclosing within it the cooling chamber 3 within which the article to be kept cool is placed together also with the cooling medium or fluid and circulatory unit by which the fluid is circulated for keeping the chamber cool. Access is had to the cooling chamber through the front of the body or casing which is provided with a removable part or door 4. Access is also preferably had through the top wall of the casing by means of the removable trap or door 5.

Arranged within the chamber of the body or casing, preferably in the extreme top part thereof, is a pan or receptacle 6 which rests upon ledges 7 projecting from the side walls of the casing. In this pan is placed ice and salt from which the brine is obtained acting as the cooling medium. The ice and salt are placed within the pan or receptacle through the trap door 5. The pan is preferably provided with a cover 8.

The space below the receptacle or pan 6 forms that part of the cooling chamber where the articles to be kept cool are placed, access being had to this chamber through the door 4.

Located within this cooling space and in surrounding relation to the article or articles contained within it is the unit for circulating the brine.

This unit comprises a number of hollow plates or slabs 10. These plates are of metal made in any suitable manner. The plates are arranged on end standing in upright positions preferably resting on the bottom of the cooler and, as explained above, in surrounding relation to the article or articles contained within it.

The interposed plate and, if desired, any or all the plates, may be provided at the bottom with a clean-out opening 11 which is normally closed by a cover 12 secured in any suitable manner to the body of the plate as by screw connections 13. This opening enables the plate to be freed from sediment or other matter deposited within it and without the necessity of removing the plate or unit from the cooler.

The plates are connected at the top and bottom by hollow connections 14. Each of these connections comprises nipples 15, 16, threaded into the respective plates and joined by a coupling nut 17. The release of the nuts permits of an easy removal of the plates, any one plate being removable without disturbing the others.

One end plate of the series at the top thereof is provided with an outlet 18 from which extends a pipe connection 19 through the insulated wall of the cooler.

Extending from the bottom of the pan or receptacle 6 is a hollow pipe connection 20 preferably made in two parts 21, 21' connected by a threaded coupling 22. The part 21' of the pipe extends into the interior of one of the hollow plates, the pipe being arranged preferably to extend into the interior of the interposed one of the plates having the cleaning opening. The pipe extends through the hollow of the plate well down into the same, but terminating at a point removed from the bottom of the plate preferably adjacent the clean-out opening. The entrance to this pipe connection from the receptacle 6 is protected by a strainer 23 located on the bottom of the receptacle and which is held in place by a pin 24 secured to the strainer and extending into the hollow of the pipe.

Inasmuch as the walls of the hollow plates are made relatively thin, the walls facing the enclosed cooling space within which the articles to be cooled are contained may be reinforced by any suitable strips or pieces 25 secured to them.

Figure 4:
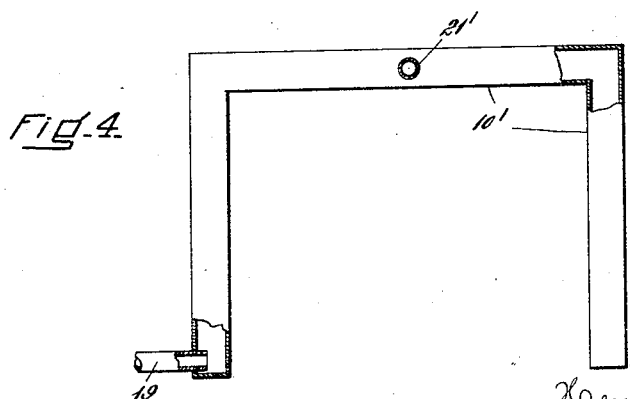
Fig. 4 is a plan of a modification.

In Fig. 4 a slight modification is shown in that only one plate 10' is employed instead of a number of connected plates, the pipe 20 entering this plate and the plate being provided with an outlet at the top.

In the operation of the cooler the brine coming from the combination of ice and salt in the receptacle 6 passes by way of the outlet pipe 20 into the plate with which the pipe connects, the brine issuing at a point near the bottom of the plate and thence passing into the bottoms of the other plates, fills the chambers of all the plates. The brine coming directly from the receptacle 6 and thus delivered into the bottoms of the respective plates is at a relatively low temperature, the tendency of the cooler brine being to remain or settle to the bottom of the plates. As the brine rises in temperature by absorbing heat from the cooling chamber it will rise within the plates and gradually pass through the top connections 14 and outlet from the end plate. The apparatus will continue to properly function even though considerable deposit may collect within the bottom of the plate or plates.

Having thus fully described my invention, I claim and desire to secure by Letters Patent of the United States:—

1. A cooler having a chambered heat-insulated body, a receptacle occupying an elevated position within the chamber of the body for containing a cooling medium, a cooling unit located below said receptacle within the chamber of said body and comprising a hollow plate arranged to occupy an upright position within said chamber, said plate having an outlet at the top thereof and a clean-out opening at the bottom, an escape pipe connection leading from said outlet, a detachable cover for the clean-out opening, and a pipe connection leading from said receptacle into the interior of said plate and terminating therein at a point adjacent said clean-out opening.

2. A cooler having a chambered heat-insulated body, a receptacle occupying an elevated position within the chamber of said body for containing a cooling medium, a cooling unit arranged below said receptacle within the chamber of said body consisting of a number of hollow plates arranged to occupy upright positions within said chamber, one of said plates having an outlet at the top thereof with an escape pipe leading therefrom, hollow releasable connections between said plates at the top and bottom thereof, respectively, and a pipe connection between said receptacle and the interior of one of said plates.

3. A cooler having a chambered heat-insulated body, a receptacle occupying an elevated position within the chamber of the body for containing a cooling medium, a cooling unit located below said receptacle within the chamber of said body, the same consisting of a number of hollow plates arranged to occupy an upright position within said chamber, one of said plates having an outlet therefrom at the top thereof and an escape pipe leading therefrom, hollow releasable connections between said plates providing communication between the interior of the respective plates at the top and bottom thereof, and a connection leading from said receptacle into the interior of one of said plates and terminating at a point therein above the bottom of the plate below said outlet.

HENRY G. JANCSY.